(12) United States Patent
Le Chevalier et al.

(10) Patent No.: US 9,069,732 B2
(45) Date of Patent: *Jun. 30, 2015

(54) AUTOMATED DOCUMENT CONVERSION TESTING

(75) Inventors: Vincent Le Chevalier, San Jose, CA (US); Charles F. Geiger, San Jose, CA (US); James R. Kellas, Milpitas, CA (US)

(73) Assignee: Chegg, Inc., Santa Clara, CA (US)

( * ) Notice: Subject to any disclaimer, the term of this patent is extended or adjusted under 35 U.S.C. 154(b) by 634 days.

This patent is subject to a terminal disclaimer.

(21) Appl. No.: 13/340,030

(22) Filed: Dec. 29, 2011

(65) Prior Publication Data

US 2013/0174011 A1    Jul. 4, 2013

(51) Int. Cl.
*G06F 17/00*  (2006.01)
*G06F 17/22*  (2006.01)
*G06F 17/30*  (2006.01)

(52) U.S. Cl.
CPC .......... *G06F 17/22* (2013.01); *G06F 17/30914* (2013.01); *G06F 17/3092* (2013.01); *G06F 17/30905* (2013.01)

(58) Field of Classification Search
CPC .......... G06F 17/30914; G06F 17/3092; G06F 17/30905; G06F 17/22
USPC ......... 715/862, 236, 239, 780, 731; 705/7.25, 705/7.33; 726/1
See application file for complete search history.

(56) References Cited

U.S. PATENT DOCUMENTS

| | | | |
|---|---|---|---|
| 6,618,751 B1 | 9/2003 | Challenger et al. | |
| 2002/0157111 A1 | 10/2002 | Reams | |
| 2003/0074559 A1 | 4/2003 | Riggs | |
| 2004/0205559 A1 | 10/2004 | Sirhall | |
| 2006/0265418 A1 | 11/2006 | Dolezal et al. | |
| 2006/0287920 A1 | 12/2006 | Perkins et al. | |
| 2007/0277102 A1 | 11/2007 | Kanzaki | |
| 2010/0077319 A1 | 3/2010 | Xu et al. | |
| 2011/0106970 A1 | 5/2011 | Song et al. | |
| 2011/0213655 A1* | 9/2011 | Henkin et al. | 705/14.49 |
| 2012/0016656 A1 | 1/2012 | Travieso et al. | |
| 2012/0158737 A1* | 6/2012 | Levy et al. | 707/748 |
| 2013/0015946 A1* | 1/2013 | Lau et al. | 340/5.2 |

* cited by examiner

*Primary Examiner* — Quoc A Tran
(74) *Attorney, Agent, or Firm* — Fenwick & West LLP

(57) ABSTRACT

Embodiments of the invention provide a system for automated document conversion testing. For each page in the received documents, the system first converts the page into a source image. The system then converts the document page into a set of markup language page elements and generates a rendered image of the markup language page elements displayed in a web browser on a target software platform. Next, the system determines a correlation factor between the source image and the rendered image. The correlation factor indicates a page fidelity between the original document and its markup language transformation. If the correlation factor exceeds a threshold established for a minimum page fidelity requirement, the markup language conversion is validated.

21 Claims, 4 Drawing Sheets

AUTOMATED DOCUMENT CONVERSION TESTING

CROSS-REFERENCE TO RELATED APPLICATION

This application is related to U.S. patent application Ser. No. 13/253,011, which is incorporated by reference in its entirety.

BACKGROUND

1. Field of the Invention

This disclosure relates to a publishing platform for aggregating, managing, and delivering electronic content to connected consumer electronic devices.

2. Description of the Related Art

The education publishing industry faces a number of significant challenges to effectively delivering media and services through an online delivery network. These challenges center around four discrete phases:

1) Ingestion: A lack of digital textbook standardization, a plethora of incompatible formats, and a lack of integration and interoperability between publishers makes it difficult to ingest and aggregate a large volume of educational content efficiently and reliably.
2) Publishing: Significant transformation of education content needs to be undertaken to ensure that the content is suited to publish across a variety of client devices that users may use to access the content.
3) Distribution: In an electronic distribution environment, particular attention needs to be given to issues of content protection and rights management, as well as service policies and quality of service, so that content providers are fairly compensated and users of the content perceive the value and reliability of the service.
4) Connected Services: In an educational platform, there exists the potential to deliver a rich user experience that extends beyond electronic access to textbooks. To implement such connected services would require complex business rules and content models that are unavailable in existing education digital publishing services.

Effectively enabling and managing each of the above four phases has not yet been accomplished by the education publishing industry. Accordingly, this has inhibited the growth of delivering media and services through an online delivery network.

SUMMARY

Embodiments of the invention provide a system for automated document conversion testing. For each page in the received documents, the system first converts the page into a source image. The system then converts the document page into a set of markup language page elements and generates a rendered image of the markup language page elements displayed in a web browser on a target software platform. Next, the system determines a correlation factor between the source image and the rendered image. The correlation factor indicates a page fidelity between the original document and its markup language transformation. If the correlation factor exceeds a threshold established for a minimum page fidelity requirement, the markup language conversion is validated.

In various embodiments, the document page comprises elements, such as an image, a graph, a table, a formula, and a body of texts. The system converts these elements into markup language page elements together with location and composition information to preserve page fidelity. The markup language elements may be in HTML5 format.

In various embodiments, the system determines the correlation factor as a number between 0 indicating no correlation and 100 indicating a perfect match. The threshold corresponds to a minimum requirement of the page fidelity depending on the type and layout of the document page.

In various embodiments, responsive to the correlation factor being lower than the threshold, the system further analyzes and corrects the markup language page elements, and regenerates the rendered image for further correlation testing.

In various embodiments, the system generates rendered images from the set of markup language page elements displayed in a plurality of browser and platform combinations, determines a correlation factor between the source image and each of the rendered images, and validates the markup language conversion in response to the correlation factors exceeding the threshold.

One skilled in the art will readily recognize from the following discussion that alternative embodiments of the structures and methods illustrated herein may be employed without departing from the principles of the invention described herein.

DETAILED DESCRIPTION OF THE EMBODIMENTS

The successful and rapid growing adoption of electronic books and web based publishing services is sometimes limited by the available digital content to offer. Publishers have to separately create digital versions of their content besides printed copies to support the new digital offerings. This separate process may introduce increased costs, digital format issues, and production delays that negatively affect the availability of the digital books at content and service providers. Given the average number of pages contained in a book or document, the large and increasing volume of books and documents to process, and the ever evolving and expanding list of consumer devices and software platforms capable of receiving digital content, manual conversion and visual testing in the traditional publishing solutions becomes more and more impractical. Therefore it is highly desirable to have an automated system for converting and testing extremely large volume of contents across permutations of multiple target devices and platforms.

In addition, despite the advance in digital conversion technologies and on-going standardization efforts in the creation and deployment of the electronic books, such as ePub standard and development toolkits, the converted digital content sometimes differs considerably from its original printed equivalent in at least one aspect: page fidelity. Page fidelity refers to the page structure of the original document, including the pagination of the original printed document, the number of columns and arrangement of paragraphs, the placement and appearance of graphics, titles and captions, and the fonts used. Page fidelity is usually not an issue for trade books given their relatively simple text structure and page layout. However, for some other categories of books (e.g., textbooks, education, travel, art, and cooking books), whose images, graphs, tables, maps, proprietary fonts, and multi-columns of text are assembled into complex sets of customized publications, maintaining page fidelity may be highly desired but quite challenging when converting into ePub format or modern markup language web pages.

Figure 1:
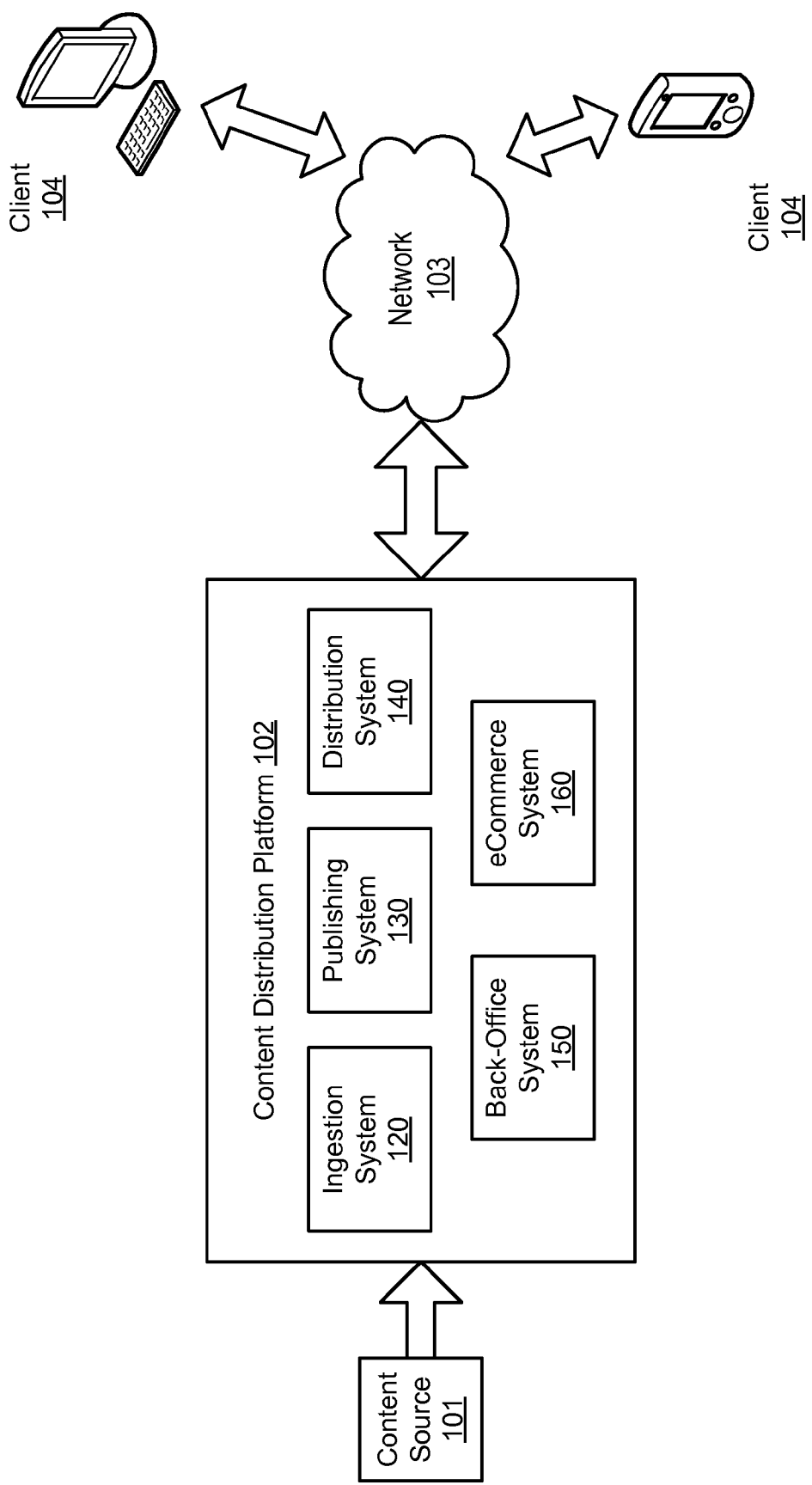
FIG. 1 is a block diagram illustrating an environment for a digital educational reading platform, in accordance with an embodiment of the invention.

Embodiments of the invention provide a system referred to as a "document conversion testing system" or "publishing system." The system transforms printed documents into, for example, markup language documents (e.g., in HTML5 web format) with enhanced metadata suited for distribution to a wide variety of computing devices. The system aims to preserve page fidelity, regardless of the original format of the source content provided by the content provider, and regardless of the complexity of the layout of the original document. To achieve the page fidelity perseverance, the system automatically analyzes and quantifies the differences in page fidelity between a printed document (e.g., a PDF file) and its markup language transformation (e.g., HTML5 web pages). Document pages that fail the page fidelity tests are flagged and examined. This publishing system is a part of an overall content distribution platform, an example of which is illustrated in FIG. 1. The content distribution platform not only facilitates aggregation, management, and distribution of digital education content, but also provides an integrated solution for digital publishing and online education services.

Platform Overview

FIG. 1 illustrates a block diagram of a system environment for a digital content delivery and online education services in accordance with an embodiment of the invention. The system environment facilitates flexible distributions of digital books from publishers to end users. The content distribution platform 102 is described in more detail in patent application U.S. Ser. No. 13/253,011 titled "Electronic Content Management and Delivery Platform" filed on 4 Oct. 2011, the disclosure of which is incorporated herein by reference in its entirety.

As shown in FIG. 1, the digital reading environment comprises a content source 101, a content distribution platform 102, a network 103, and one or more clients 104. The content source 101 includes digital and printed content automatically gathered and aggregated from a large number of publishers, categories, and partners. Examples of content include textbooks, trade books, magazines, newspapers, user-generated content, web content, and advertising content.

The content distribution platform 102 aggregates, validates, transforms, packages, and monetizes the content collected by the content source 101 into a number of business services, prior to distribution to the clients 104 over the network 103. The platform comprises five systems: an ingestion system 120, a publishing system 130, a distribution system 140, a back-office system 150, and an eCommerce system 160.

The ingestion system 120 first gathers information on the type, file formats, and file manifest of the content. The ingestion system then checks files' integrity and conformity to standards, such as PDF, ePUB2, ePUB3, XML, HTML, and other formats. Content files that fail the integrity and conformity checks are flagged for further testing and repairing. Each content file that passes the checks is assigned a unique identifier and stored in a database for access by the publishing system 130.

The publishing system 130 converts ingested documents into markup language documents, for example, an HTML5 web page with enhanced metadata, which is well-suited to distribution across a wide variety of computing devices connected to the content distribution platform 102 via the network 103. Due to the original format of the source content and the complexity of the layout of the original document, the converted markup language documents are tested by the publishing system 130 to determine whether the conversion preserves the page fidelity compared to the original printed document. The page fidelity includes the original page structure, such as the pagination of the original printed document, the number of columns and arrangement of paragraphs, the placement and appearance of graphics, titles and captions, and the fonts used. Only converted documents that meet a minimum requirement of page fidelity are approved for distribution. More details of the publishing system 120 are described with reference to FIG. 2 below.

The distribution system 140 packages the content for delivery and uploads the content to content distribution networks. Then, the distribution system 140 makes the content available to end-users based on the content's digital rights management policies.

The back-office system 150 handles tasks dedicated to running business within the content distribution platform, such as accounting, human resource, and project management. The back-office system 150 also manages the interactions with customers, clients, and sales.

The eCommerce system 160 manages the online processes of marketing, selling, servicing and receiving payments for digital products and services. Hence the eCommerce system 160 is closely interfaced to the publishing system 130, distribution system 140, as well as the back-office system 150.

The network 103 facilitates content and service distribution and communications between various components of the system environment. Contents are packaged and distributed across the network 103 for client consumption. The overall quality of service received by the clients is also monitored and reported back to the content distribution platform 102 over the network 103. The network 103 is typically a content delivery network (CDN) built on the Internet, but may include any network, including but not limited to a LAN, a MAN, a WAN, a mobile wired or wireless network, a private network, or a virtual private network.

The clients 104 access the content from web browsers on computing devices connected to the network 103. The computing devices include a personal computer, such as a desktop, laptop, or tablet computer, a personal digital assistant, a mobile or smart phone, or a television "set-top box" using a client web application. The educational content are transformed by the content distribution platform 102 and delivered to the clients 104 across the network 103. As the clients enjoy the consistent reading experiences and high-quality services, the web browsers on the clients' devices regularly communicate with the content distribution platform 102 for updating reading content and connected services. In addition, user data on the clients' experience with the service and quality of the network connections are also collected and uploaded to the content distribution platform 102 through network 103.

In contrast to existing digital publishing services, such as AMAZON KINDLE®, the disclosed content distribution platform does not require users to purchase a specific client device or download a specific application from the service provider to access the content. Rather, any HTML5 compatible browser on a user's computing device may receive, from the content distribution platform 102, structureless HTML5 page elements to construct pages of a document on the browser, along with a host of document specific metadata to enhance the user's reading experience with the document, such as thumbnail navigation and an interactive table of contents. The HTML5 pages of the document also supports a number of reading activities, such as creating highlights, taking notes, and accessing a dictionary. Annotations, such as highlights, drawings, notes, comments, and other personalized data created by the user can be displayed as an overlay on the original content, stored and archived in the user account, synchronized across all registered devices of the user, and optionally shared among the user's friends, classmates, campus, or other groups, as part of an education social platform. It is noted that although embodiments of the invention are described herein with reference to HTML5, other markup languages with suitable characteristics may also be used in place of HTML5.

Automated Conversion Testing

Embodiments of the invention provide a system (and a method and a computer readable storage medium) for automated document conversion testing. This automated testing system is referred to as the publishing system 130 in FIG. 1. The system 130 receives ingested documents for conversion from the ingestion system 120. For each page in the received documents, the system 130 first converts the page into a source image. The system 130 then converts the document page into a set of markup language page elements and generates a rendered image of the markup language page elements displayed in a web browser on a target software platform. Next, the system 130 analyzes the source image, as well as the rendered image of the markup language page elements. Based on the analysis results, the system automatically determines a correlation factor between the original document and the converted content. The correlation factor indicates the page fidelity quality between the printed document and its markup language transformation. If the correlation factor does not meet a threshold established for a minimum page fidelity, the page is flagged and its associated digital conversion is examined. Otherwise, the converted markup language page elements are validated.

Figure 2:
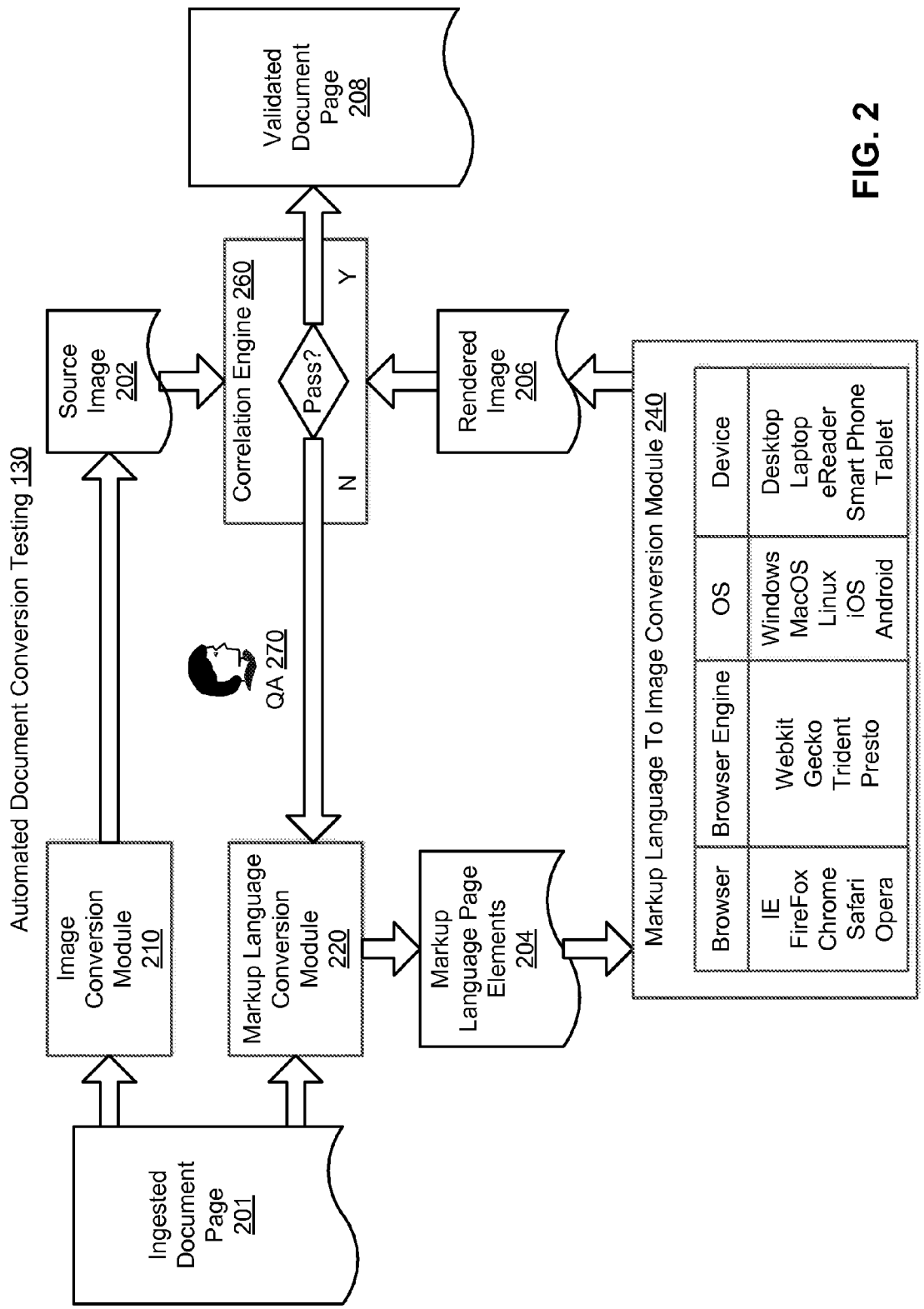
FIG. 2 is a block diagram illustrating an automated system for performing document conversion testing, in accordance with an embodiment of the invention.

FIG. 2 illustrates a block diagram of an embodiment of the automated document conversion testing system 130. The system comprises an image conversion module 210, a markup language conversion module 220, a markup language to image conversion module 240, and a correlation engine 260.

The image conversion module 210 converts the ingested document page 201 into a source image 202. The conversion module 210 can take the input page 201 from a digital document in PDF, ePUB, and other formats, and output the image 202 in BMP, TIFF, and other image formats. The source image 202 thus generated is identical to the original document page 201 since there are no changes in content layout during the conversion. This source image conversion can be performed in a batch process asynchronous to other processes in the system 130, for example, converting all the pages in a textbook to a set of source images in one batch.

To remove the need for specific reader applications and/or end-user devices, the markup language conversion module 220 converts the ingested document page 201 into a set of markup language page elements 204. After receiving the document page 201, the markup language conversion module 220 dissects the page into elements of information, such as various regions of texts and images, which are converted into markup language page elements. In the meantime, the markup language conversion module 220 also creates a set of structure metadata associated with the location and composition of the elements of information. The list of the structure metadata can include, for example, sizes and types of images, locations, captions, number and size of columns, paragraphs, type of layout, embedded references, partial and full content indexing, border size, blank pages, and many other structure metadata, which identifies all the elements on a printed page. Thus, the page 201 is transformed into the downloadable markup language page elements 204 with associated structure metadata regardless of the original source content format. In addition, the markup language conversion module 220 can also extract basic metadata from the document. For example, basic metadata common to all the pages in a textbook may include ISBN number, author, title, publisher name, release date, short description, among other book specific data.

The markup language to image conversion module 240 generates a rendered image 206 for any browser and platform combinations from the markup language page elements 204. Because the markup language page may be displayed on a variety of web browsers on different consumer devices across multiple platforms, potential compatibility issues can be introduced by the markup language conversion. Therefore, the markup language to image conversion module 240 automatically generates a rendered image of the markup language page elements 204 displayed on each and every browser and platform combination across multiple consumer devices. As a result, each rendered image is an accurate representation of the rendering of the markup language page elements 204 by a respective web browser environment. These rendered images can then be compared to the source image for page fidelity testing.

The markup language to image conversion module 240 supports a matrix of web browsers, browser engines, operating systems, and client devices. The web browsers include INTERNET EXPLORER®, FIREFOX®, GOOGLE CHROME®, SAFARI®, and O® Opera Browser. These browsers are built upon various browser layout engines (e.g., WEBKIT®, Gecko, Trident, and PRESTO®) on top of different platforms, such as desktop operating systems (e.g., MICROSOFT WINDOWS®, MAC OS®, and LINUX®) and mobile operating systems (e.g., IOS® and ANDROID®). Consumer devices comprise desktops, laptops, eReaders, smart phones, and tablets, as shown in FIG. 2.

Page fidelity of the original document can be compromised due to complex layout or target web browser conformity issues during markup language conversion and rendering. The correlation engine 260 analyzes both the source image 202 and the rendered image 206 for a specific web browser on a target software platform, and establishes a correlation factor to quantify the differences in page fidelity between the original document page and its markup language transformation.

The correlation engine 260 may adopt various analysis techniques for comparing the rendered image to the sourced image. The selection of a particular technique for correlation analysis may depend on the complexity of the pages. In one embodiment, a simple text comparison algorithm can be used for book pages with only texts. In another embodiment, for example, a statistical method similar to a face recognition algorithm in video or image processing can be utilized to document layouts that include not only texts but also graphics and images.

In other embodiments, more complicated approaches can be applied to check page layout fidelities. Instead of treating an individual page as a whole, the page is dissected into a collection of basic elements following rules to identify different parts. Each individual page may be analyzed to determine regions of characters, blank spaces, and images. To further determine whether a region corresponds to a heading, subheading, body text, caption, or other identifiable parts, the font size, the relative position of the region or objects, and the presence and/or absence of entries in the table of contents or index, are all taken into considerations in categorizing regions. For example, a text region adjacent to an image with relatively few words that matches the text in the figures' list is most likely a caption of the image. When individual pages are processed into multiple regions, the correlation engine can be designed around a customized analysis, for example, a PCA-LCA analysis that combines the principal components analysis (PCA) and linear discriminant analysis (LDA) algorithm.

After the correlation analysis between the source image and rendered image is performed, the correlation engine 260 establishes a correlation factor C between the source image and rendered image is determined 308. The correlation factor C can be a score between 0 and 100, where 0 means no correlation at all and 100 means a perfect match. In case of the PCA-LCA analysis, the correlation factor C can be defined as a weighted sum of fidelity quality of all the corresponding regions in a pair of source and rendered pages.

Figure 3:
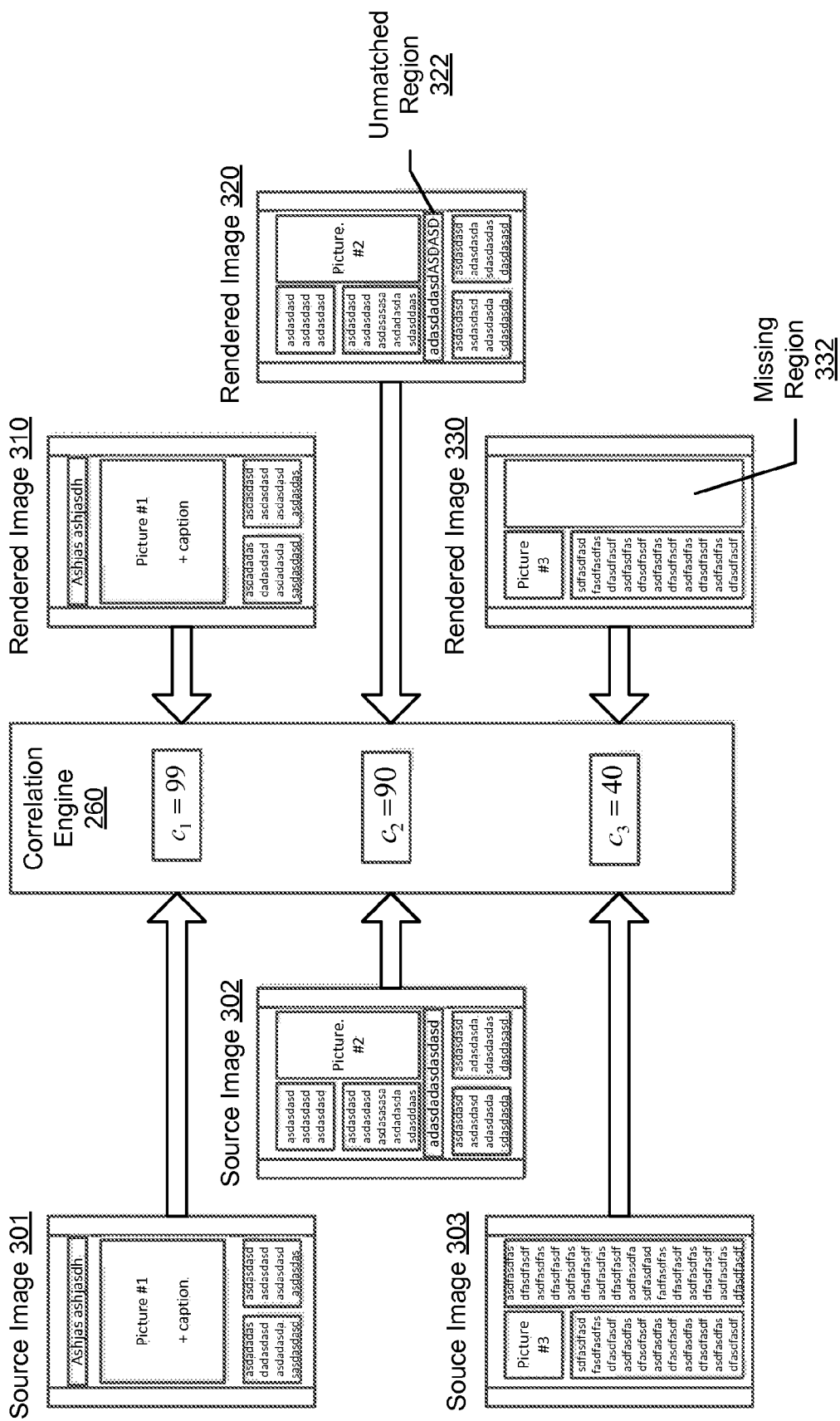
FIG. 3 is a block diagram illustrating the outcome of a correlation engine, in accordance with an embodiment of the invention.

FIG. 3 is a block diagram illustrating the outcome of the correlation engine 260, in accordance with an embodiment of the invention. In FIG. 3, the correlation engine 260 performs correlation analysis on three pair of source and rendered images 301 and 310, 302 and 320, and 303 and 330. The outcome correlation factor C is defined as a number between 0 (no correlation) and 100 (perfect match). The correlation factor between images 301 and 310 is 99, which is near perfection, while correlation factor between images 302 and 320 is 90 due to a small unmatched region 322. Rendered image 330, on the other hand, contains a missing region 332 compared to the source image 303, which results in a low correlation factor value of 40. In other embodiments, the PCA-LCA correlation analysis can also identify the regions with problems, such as the unmatched region 322 and the missing region 332.

Referring again to FIG. 2, the correlation engine 260 is configured with a minimum requirement on the page fidelity in terms of a threshold or a predefined value of the correlation factor to determine whether the markup language conversion of the document page 201 passes the page fidelity test. Converted pages with correlation factors higher than the threshold, such as a validated document page 208, are deemed ready for distribution and stored in the repository database; whereas pages with correlation factors lower than the threshold are flagged and subjected to further examination, for example by a human quality assurance (QA) operator 270 who monitors the conversion and validating process. A failed page with a correlation factor value slightly lower than the threshold may still be validated by the quality assurance operator 270 from his or her perspective. On the other hand, the markup language elements of a failed page may need to be analyzed, corrected, and eventually resubmitted to the markup language conversion module 220 for correlation and validation, which include regenerating the rendered image for further correlation testing.

The threshold correlation factor can vary depending on the category of the documents and complexity of the page layout of the particular documents. For example, if the threshold of correlation factor is set at 90 for the pages in FIG. 3, the rendered image 310 passes the check, and rendered image 320 may also be validated if the unmatched region 322 does not affect users' experience with the page. Rendered image 330, on the other hand, is flagged and subjected to further examination.

Similar to the image conversion module 210, the markup language conversion module 220, the markup language to image conversion module 240, and the correlation engine 260 can all schedule their respective conversion or testing tasks in batch processes asynchronous to other processes in the system 130, as long as the inputs are provided.

In a summary, the document conversion testing system 130 automates the tasks of converting large volumes of source content, rendering an even larger number of the converted markup language web pages on a variety of target web browsers and target platforms, and comparing the rendered markup language web pages to the original pages without manual intervention. For example, a single textbook typically contains several hundred pages, which have to be converted and compared against thousands of rendered converted markup language pages for page fidelity test. Therefore, this automation process is critical for the success of the digital content delivery and online education services in order to increase the volume of digital content offerings and to facilitate broad content deployment.

Figure 4:
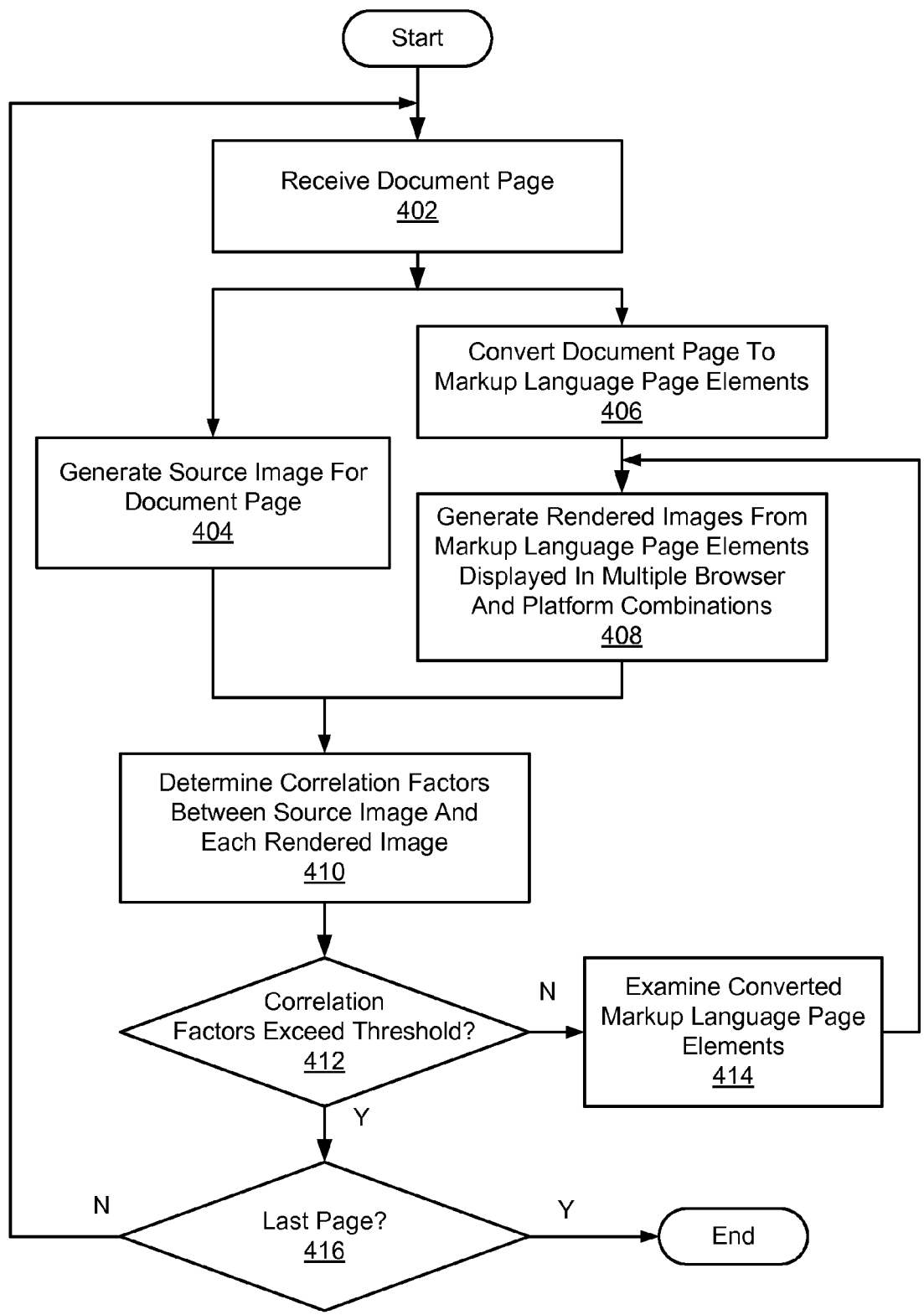
FIG. 4 is a flowchart illustrating the method of performing automated document conversion testing, in accordance with an embodiment of the invention.

FIG. 4 illustrates a flowchart illustrating an embodiment of the method for performing document conversion testing, such as would be executed by the automated document conversion testing system 130. First, a page of an original document is received 402. For example, the publishing system 130 receives an ingested document page 201, as described above with reference to FIG. 2. Next, in one example process, a source image for the document page is generated 404, for example, by converting the source image into a bitmap image through the image conversion module 210 as described above with reference to FIG. 2. There are no changes in content layout and page fidelity in the source images, which are identical to the original document pages.

In another separate example process, the document page is converted 406 into a set of markup language page elements. For example, the markup language conversion module 220 transforms the document page 201 into a set of markup language page elements 204, as described above with reference to FIG. 2. The markup language page elements are then used to generate 408 rendered images from a displayed markup language page in multiple browser and platform combinations, in an effort to keep the page structure and layout of the original book page. For example, the markup language to image conversion module 240 renders an image 206 from the markup language page elements 204 in a browser on a target platform, as described above with reference to FIG. 2.

After both processes are finished, correlation factor between the source image and each of rendered images are determined 410. For example, the correlation engine 260, as described above with reference to FIG. 2, adopts various analysis techniques (e.g., a text comparison and image recognition algorithm or the PCA-LPA algorithm), and establishes a correlation factor to quantify the differences in page fidelity between the original document page and its markup language transformation.

Subsequently, it is decided whether the correlation factor exceeds 412 a threshold corresponding to a minimum requirement on the page fidelity. If the correlation factor is below the threshold, the markup language page elements are examined 414 and returned for generating 408 a rendered image. Otherwise, the conversions and testing are repeated starting from receiving 402 the next available page, given that the current page is not 416 the last page. When the last page has been treated, the method ends.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method of automated document conversion testing, the method comprising:
for a plurality of document pages of a multi-page document:
converting an entire received document page into a single source image;
converting the entire document page into a set of markup language page elements;
generating, for each of a plurality of target software platforms, a single rendered image corresponding to the entire received document page, each rendered image generated from the set of markup language page elements displayed on a corresponding target software platform, each target platform characterized by a combination of at least a web browser and an operating system;
determining, by a computer, for each of the plurality of target software platforms, a correlation factor between the source image and the rendered image, wherein the correlation factor indicates a page fidelity between the source image and the rendered image for that target platform;
obtaining a threshold correlation factor for the document page, the threshold correlation factor representing a common fidelity criterion for the document page across the plurality of target software platforms; and
responsive to the correlation factor for a given target platform exceeding the threshold correlation factor, validating the markup language page elements for the given target platform.

2. The method of claim 1, wherein the document page comprises elements including at least one of an image, a graph, a table, a formula, and a body of texts.

3. The method of claim 2, wherein converting the document page into the markup language page elements comprises converting the document page elements into markup language page elements with location and composition information to preserve page fidelity.

4. The method of claim 1, wherein the markup language page elements are in HTML5 format.

5. The method of claim 1, wherein the correlation factor is a number, which ranges between 0 indicating no correlation and 100 indicating a perfect match.

6. The method of claim 1, wherein the threshold correlation factor corresponds to a minimum requirement of the page fidelity, which depends on the type and layout of the document page.

7. The method of claim 1, further comprising:
responsive to the correlation factor being lower than the threshold correlation factor:
analyzing the markup language page elements;
correcting the markup language page elements; and
regenerating the rendered image from the corrected markup language page elements to determine another correlation factor.

8. A non-transitory computer-readable storage medium storing executable computer program instructions for automated document conversion testing, the computer program instructions comprising instructions for:
for a plurality of document pages of a multi-page document:
converting an entire received document page into a single source image;
converting the entire document page into a set of markup language page elements;
generating, for each of a plurality of target software platforms, a single rendered image corresponding to the entire received document page, each rendered image generated from the set of markup language page elements displayed on a corresponding target software platform, each target platform characterized by a combination of at least a web browser and an operating system;
determining, for each of the plurality of target software platforms, a correlation factor between the source image and the rendered image, wherein the correlation factor indicates a page fidelity between the source image and the rendered image for that target platform;
obtaining a threshold correlation factor for the document page, the threshold correlation factor representing a common fidelity criterion for the document page across the plurality of target software platforms; and
responsive to the correlation factor for a given target platform exceeding the threshold correlation factor, validating the markup language page elements for the given target platform.

9. The non-transitory computer-readable storage medium of claim 8, wherein the document page comprises elements including at least one of an image, a graph, a table, a formula, and a body of texts.

10. The non-transitory computer-readable storage medium of claim 9, wherein converting the document page into the markup language page elements comprises converting the document page elements into markup language page elements with location and composition information to preserve page fidelity.

11. The non-transitory computer-readable storage medium of claim 8, wherein the markup language page elements are in HTML5 format.

12. The non-transitory computer-readable storage medium of claim 8, wherein the correlation factor is a number, which ranges between 0 indicating no correlation and 100 indicating a perfect match.

13. The non-transitory computer-readable storage medium of claim 8, wherein the threshold correlation factor corresponds to a minimum requirement of the page fidelity, which depends on the type and layout of the document page.

14. The non-transitory computer-readable storage medium of claim 8, wherein the computer program instructions further comprise instructions for:
responsive to the correlation factor being lower than the threshold correlation factor:
analyzing the markup language page elements;
correcting the markup language page elements; and
regenerating the rendered image from the corrected markup language page elements to determine another correlation factor.

15. A system for automated document conversion testing, the system comprising:
a processor;
a first converting module for converting an entire received document page into a single source image;
a second converting module for converting the entire document page into a set of markup language page elements;
an image-generation module for generating, for each of a plurality of target software platforms, a single rendered image corresponding to the entire received document page, each rendered image generated from the set of markup language page elements displayed on a corresponding target software platform, each target platform characterized by a combination of at least a web browser and an operating system;
a determination module for determining, for each of the plurality of target software platforms, a correlation factor between the source image and the rendered image, wherein the correlation factor indicates a page fidelity between the source image and the rendered image for that target platform; and
a validation module for validating the markup language page elements for the given target platform in response to the correlation factor exceeding a threshold correlation factor for the document page, the threshold correlation factor representing a common fidelity criterion for the document page across the plurality of target software platforms.

16. The system of claim 15, wherein the document page comprises elements of at least one of an image, a graph, a table, a formula, and a body of texts.

17. The system of claim 16, wherein while converting the document page into the markup language page elements, the second converting module is further configured for converting the document page elements into markup language page elements with location and composition information to preserve page fidelity.

18. The system of claim 15, wherein the markup language page elements are in HTML5 format.

19. The system of claim 15, wherein the correlation factor is a number, which ranges between 0 indicating no correlation and 100 indicating a perfect match.

20. The system of claim 15, wherein the threshold correlation factor corresponds to a minimum requirement of the page fidelity, which depends on the type and layout of the document page.

21. The system of claim 15, further comprising:
an analysis module for analyzing the markup language page elements in response to the correlation factor being lower than the threshold correlation factor;
a correction module for correcting the converted markup language page elements; and
wherein the image-generation module is further configured for regenerating the rendered image of the corrected markup language page elements to determine another correlation factor.

* * * * *